United States Patent [19]
Benjamin et al.

[11] 3,879,045
[45] Apr. 22, 1975

[54] INDEXING CHUCK WITH POSITION SENSOR

[75] Inventors: Milton L. Benjamin, Chagrin Falls; David D. Walker, Solon; Arthur R. Crawford, West Jefferson, all of Ohio

[73] Assignee: Erickson Tool Company, Solon, Ohio

[22] Filed: May 6, 1974

[21] Appl. No.: 467,397

[52] U.S. Cl. .......................... 279/5; 10/128; 408/71
[51] Int. Cl. ............................................ B23b 31/36
[58] Field of Search ............. 279/5; 10/128; 408/71, 408/40, 38

[56] References Cited
UNITED STATES PATENTS
3,630,536  12/1971  Scharfen ................................. 279/5
3,841,780  10/1974  Mengeringhausen ................. 10/128

*Primary Examiner*—Leonidas Vlachos
*Attorney, Agent, or Firm*—Donnelly, Maky, Renner & Otto

[57] ABSTRACT

An indexing chuck for a tape controlled machine tool such as a turret lathe characterized in that the indexable work gripping jaw assembly thereof has a sensor cap on the periphery of the chuck body which is indexed in unison with the jaw assembly and which, during the rotation of the chuck, moves past in close proximity to but out of contact with a pickup head to produce electrical impulses for operating a selected relay when the work gripped by the jaws is in the desired indexed position for operation by the selected tool of the turret. When the jaws and sensor cap are in any other indexed position, the electrical impulses are such that a corresponding relay is energized but such relay, not then being in the tape control circuit, will not cause the tool turret to be advanced to engage the improperly indexed work.

8 Claims, 10 Drawing Figures

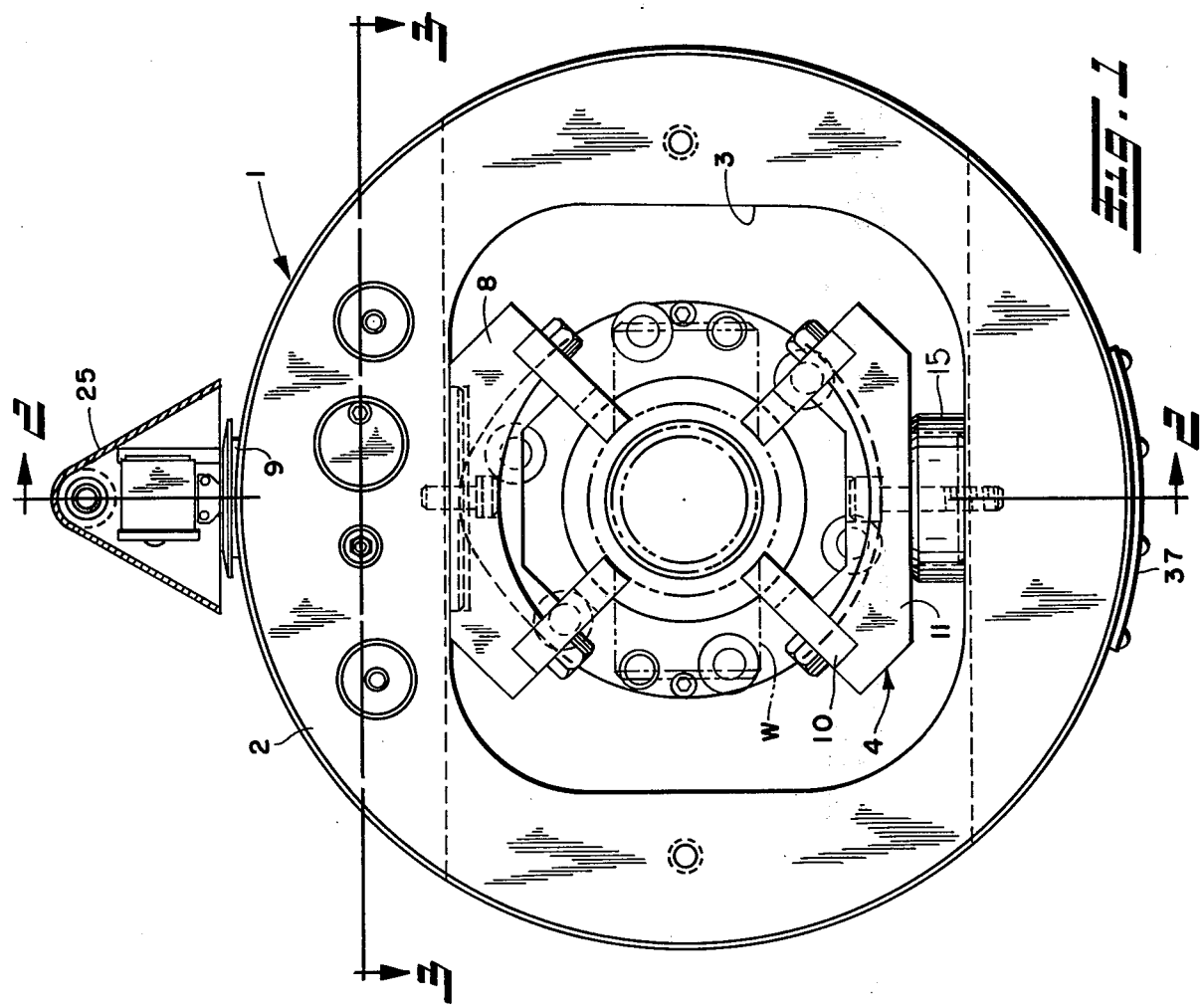
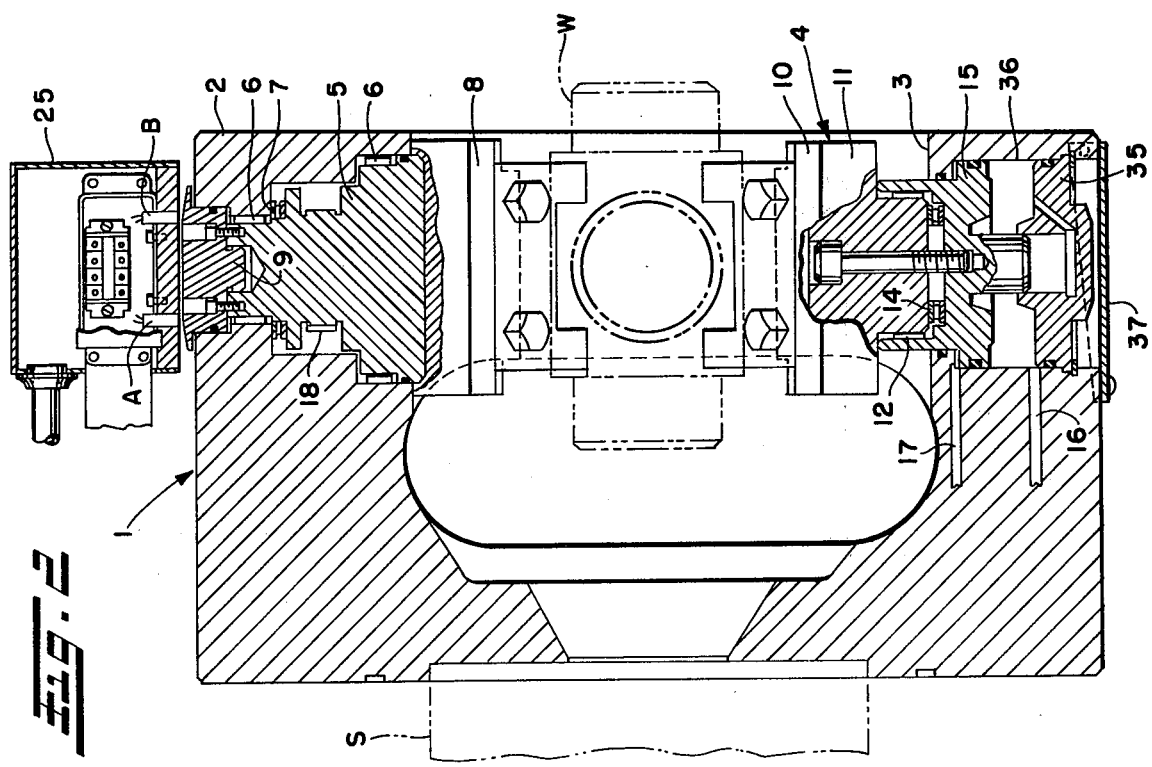

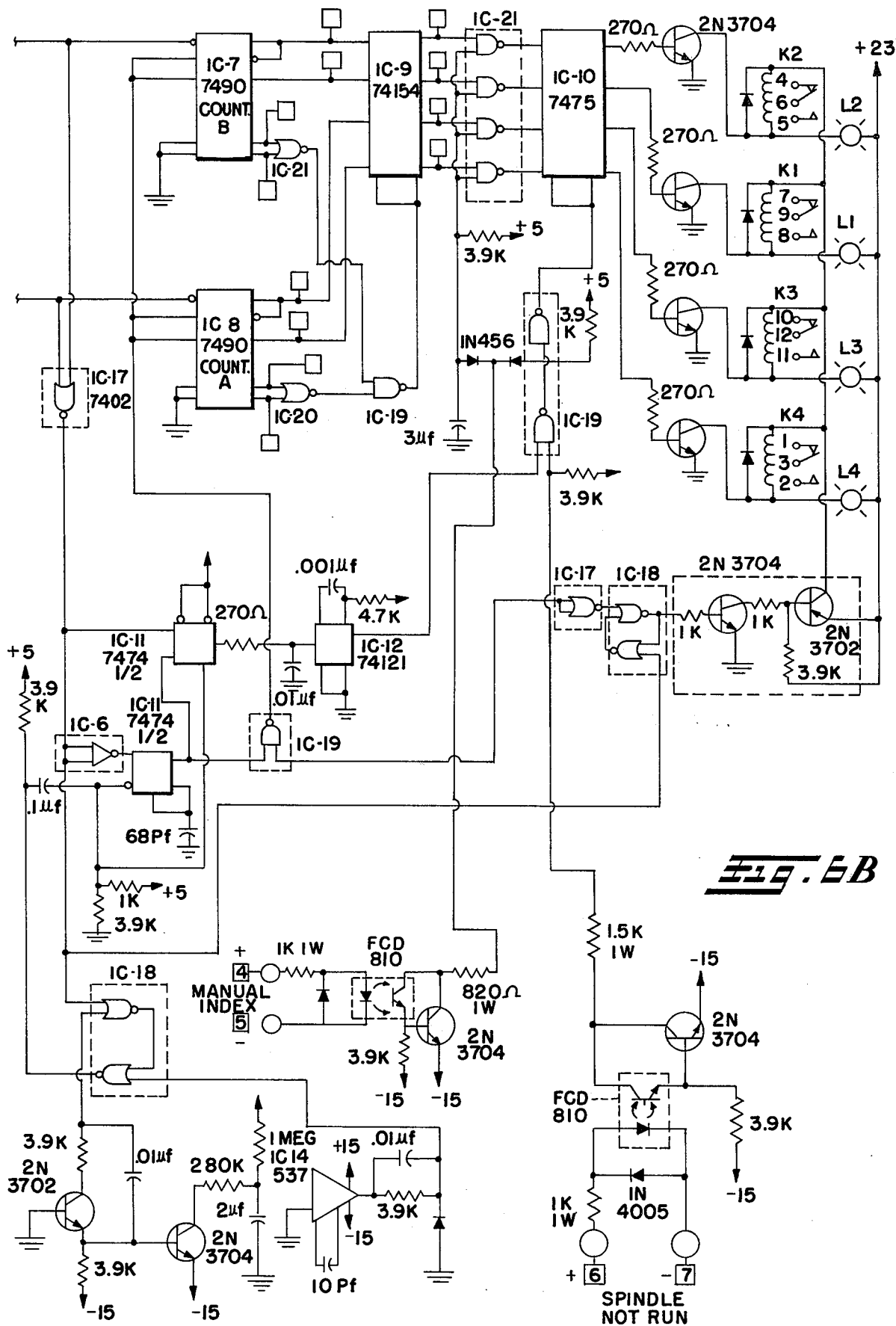

INDEXING CHUCK WITH POSITION SENSOR

BACKGROUND OF THE INVENTION

In one known form of indexing chuck with a position sensor as disclosed for example in the U.S. Pat. No. 3,630,536, the sensing device is mechanically actuated and is of complex and expensive construction comprising a signal disc on the jaw assembly provided with grooves or cams which pass a radially inwardly actuated finger when the work is in a selected indexed position, therebeing a number of fingers corresponding to the number of indexed positions of the work clamping jaws. When the signal disc is not in the selected indexed position, it will mechanically trip the selected inwardly actuated finger thus to discontinue operation of the machine tool.

SUMMARY OF THE INVENTION

In contradistinction to the foregoing, the indexing chuck herein has a position sensor which is of simple compact and inexpensive construction without moving parts.

It is a principal object of this invention to provide an indexing chuck with a position sensor including a sensor cap having a smooth radially outer surface to produce different pulse patterns for the respective indexed positions of the work clamping jaws in an electronic pickup circuit to energize respective ones of a plurality of relays which correspond in number to the number of indexed positions of the work clamping jaws.

It is another object of this invention to provide an indexing chuck of the character indicated in which the sensor cap comprises a disc of non-magnetic material such as aluminum having a peripheral ring of magnetic material such as steel and like pins within said ring embedded in the disc flush with the radially outer surface therof, said ring and pins being arranged in the disc so as to produce different pulse patterns in the pickup and relay circuitry as the disc passes the pickup head mounted radially outward of the chuck body.

Other objects and advantages will appear from the ensuing description.

BRIEF DESCRIPTION OF THE DRAWING

FIG. 1 is a front elevation view of an indexing chuck according to the present invention;

FIG. 2 is a cross-section view taken substantially along the line 2—2 passing through the axis of the chuck;

FIGS. 6A-6B is a schematic diagram of the sensing circuit wherein the selected one of a plurality of relays corresponding to the number of indexed positions of the work clamping jaws and sensor cap are in the desired indexed position for continued operation of the machine tool so that the desired tool is fed toward the proper portion of the work.

DETAIL DESCRIPTION OF A PREFERRED EMBODIMENT

Figure 3:
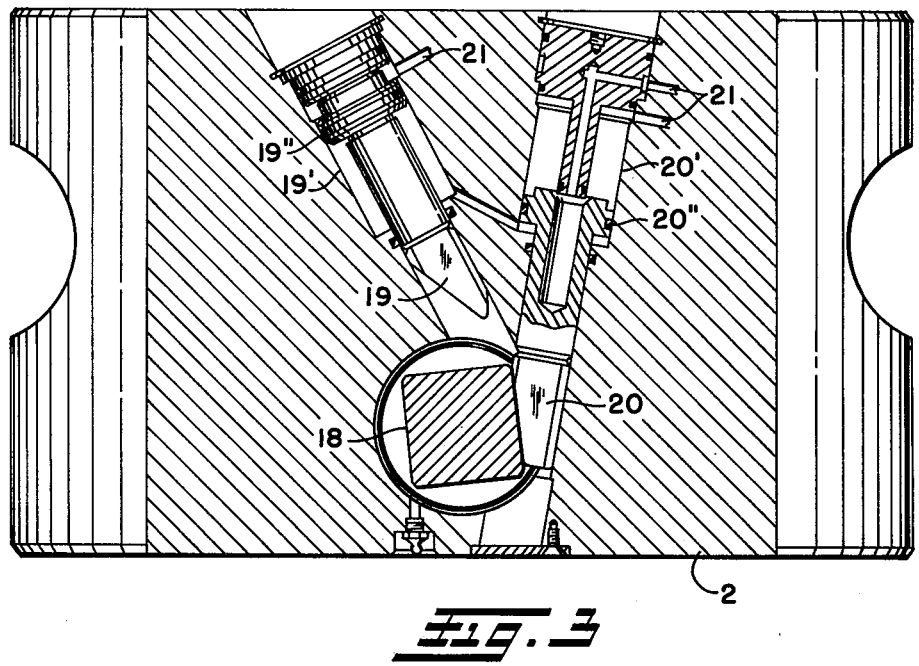
FIG. 3 is a cross-section view taken substantially along the line 3—3, FIG. 1.

Referring first to FIGS. 1–3 and also FIGS. 4a to 4d, the indexing chuck 1 herein comprises a chuck body 2 adapted to be mounted on a machine tool spindle S for rotation about its central longitudinal axis and having a cavity 3 containing an indexable work clamp assembly 4 indexable about an axis extending diametrically through the chuck body 2 and including an indexing shaft 5 which is supported in the chuck body 2 by radial and axial thrust bearings 6 and 7 for rotary indexing movement about such indexing axis. Said indexing shaft 5 is adapted to have bolted thereto a clamping jaw 8 to engage one side of the work W, said indexing shaft 5 also having secured thereto the sensor cap 9 which projects radially beyond the periphery of the chuck body 2. The movable jaw 10 to engage the other side of the work W is mounted on a jaw base 11 which is supported by radial and axial thrust bearings 12 and 14 in a piston 15 which, upon admission of fluid under pressure through the passage 16, actuates the jaw 10 into gripping engagement with the work W and which, upon admission of fluid under pressure through the passage 17, actuates the jaw 10 radially outwardly for removal of the work W.

As well known in the art, the passage 16 may be provided with a fail-safe check valve to retain fluid pressure to maintain gripping engagement of the jaws 8 and 10 with the work W even if hydraulic pressure is lost by failure of the pump or leakage of the lines leading to the spindle S. Also as well known, the passages 16 and 17 will communicate with passages in the spindle S, and at the end of the spindle S remote from the chuck 1 a rotary coupling will be provided and the admission and release of fluid under pressure alternately into and from said passages 16 and 17 will be controlled by a suitable four-way reversing valve.

In the case of a four position indexing chuck 1 as herein shown, the indexing shaft 5 is provided with a square section 18 with which the piston actuated index pins 19 and 20 are successively engageable with the index pin 19 advancing the indexing shaft 5 45° while the index pin 20 is retracted and with the index pin 20 advancing the indexing shaft 5 the remaining 45° to locked and indexed position while said index pin 19 is retracted. If desired, the cylinders 19' and 20' for the respective pistons 19'' and 20'' may be interconnected as shown for forward movement of one piston 19'' or 20'' while the other piston 20'' or 19'' is simultaneously retracted. Hydraulic actuation herein is effected by alternately communicating the passages 21 with a fluid pressure source and a reservoir.

Figure 4A:
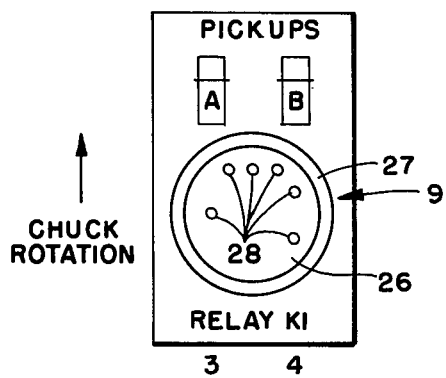
FIGS. 4a, 4b, 4c, and 4d are plan views of the sensor cap showing the same in its respective indexed positions in a chuck having four indexed positions 90° apart, said Figs. also showing the sensing cap in its respective positions in relation to the dual pickups of the sensor past which the sensor cap moves in close proximity but out of contact therewith during rotation of the chuck.
Figure 4B:
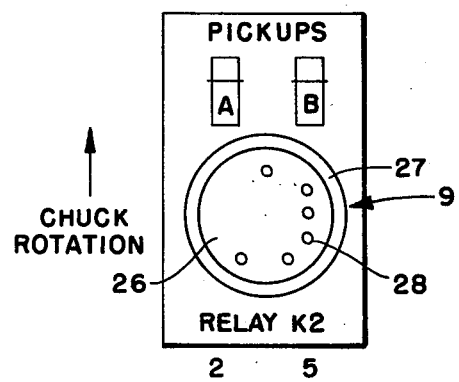
Figure 4C:
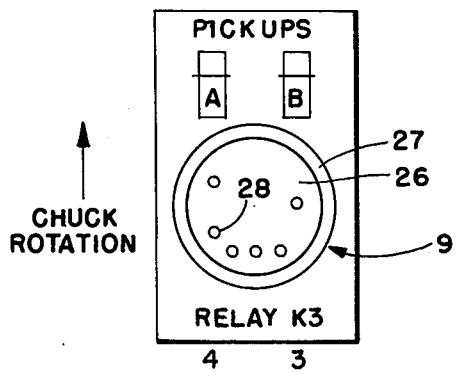
Figure 4D:
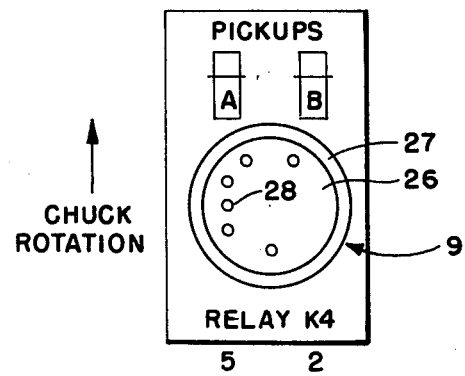
Figure 6A:
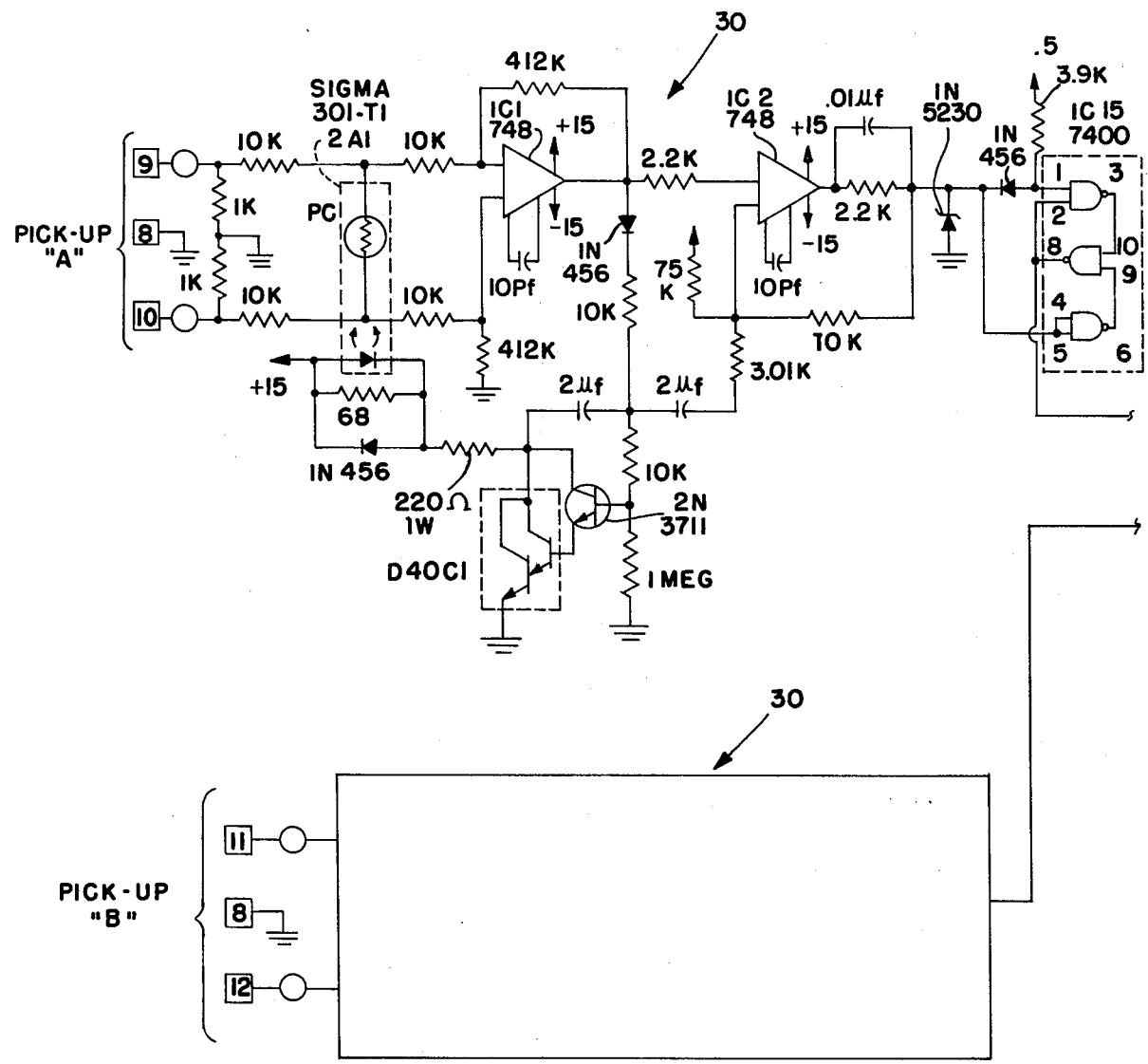

At the top of the chuck 1 is an electronic pickup head 25 having two pickup units A and B and as best shown in FIGS. 4a to 4d, the sensor cap 9 comprises a nonmagnetic disc 26 as of aluminum having a peripheral ring portion 27 of magnetic material such as steel. Embedded in said cap 9 and having outer ends flush with the radially outer surface of the disc 26 are pins 28 of magnetic material such as steel. When the sensor disc 26 is in the position shown in FIG. 4a, the rotation of the chuck 1 will cause the sensor disc to pass under the pickups A and B to cause three impulses to be picked up by the pickup A and four impulses to be picked up by the pickup A. When these impulses are directed through the electronic circuitry as shown in FIGS. 6A and 6B, the relay K1 will be energized so that the proper tool as selected by the tape in the machine tool control mechanism will advance to engage the proper portion of the work W. Upon completion of the work stroke of the selected tool with the selected portion of the work, the tape control effects return of the tool. After that tool and any succeeding tools have performed their machining operations on the work W, the tape control will signal indexing of the chuck 1 to another position. In the case of FIG. 4b, the clamping jaw assembly 4 and sensor cap 9 have been indexed 90° from the position shown in FIG. 4a whereby the pickup unit A will receive two impulses from the sensor cap 9 while the pickup B will receive five impulses and when the electronic circuitry receives these two and five impulses from the movement of the sensor cap 9 under the dual pickup A and B the relay K2 will be energized whereby the machining operation of the work W may be continued with the appropriate tool or tools. In the next indexed position which is shown in FIG. 4c the jaw assembly 4 has been rotated another 90° in which case the pickup A will receive four impulses and the pickup B will receive three impulses and the electronic circuitry will count and resolve these impulses to actuate the relay K3 so that again the appropriate tool or tools will engage the correct portion of the work W. Finally, in the fourth indexing position as shown in FIG. 4d, the pickup A will receive five impulses while the pickup B will receive two impulses, and again the electronic circuitry will count and resolve the two sets of impulses from the pickups A and B to energize the relay K4 so that the machine tool may perform the desired machining operation on the correct portion of the work W.

Figure 5:
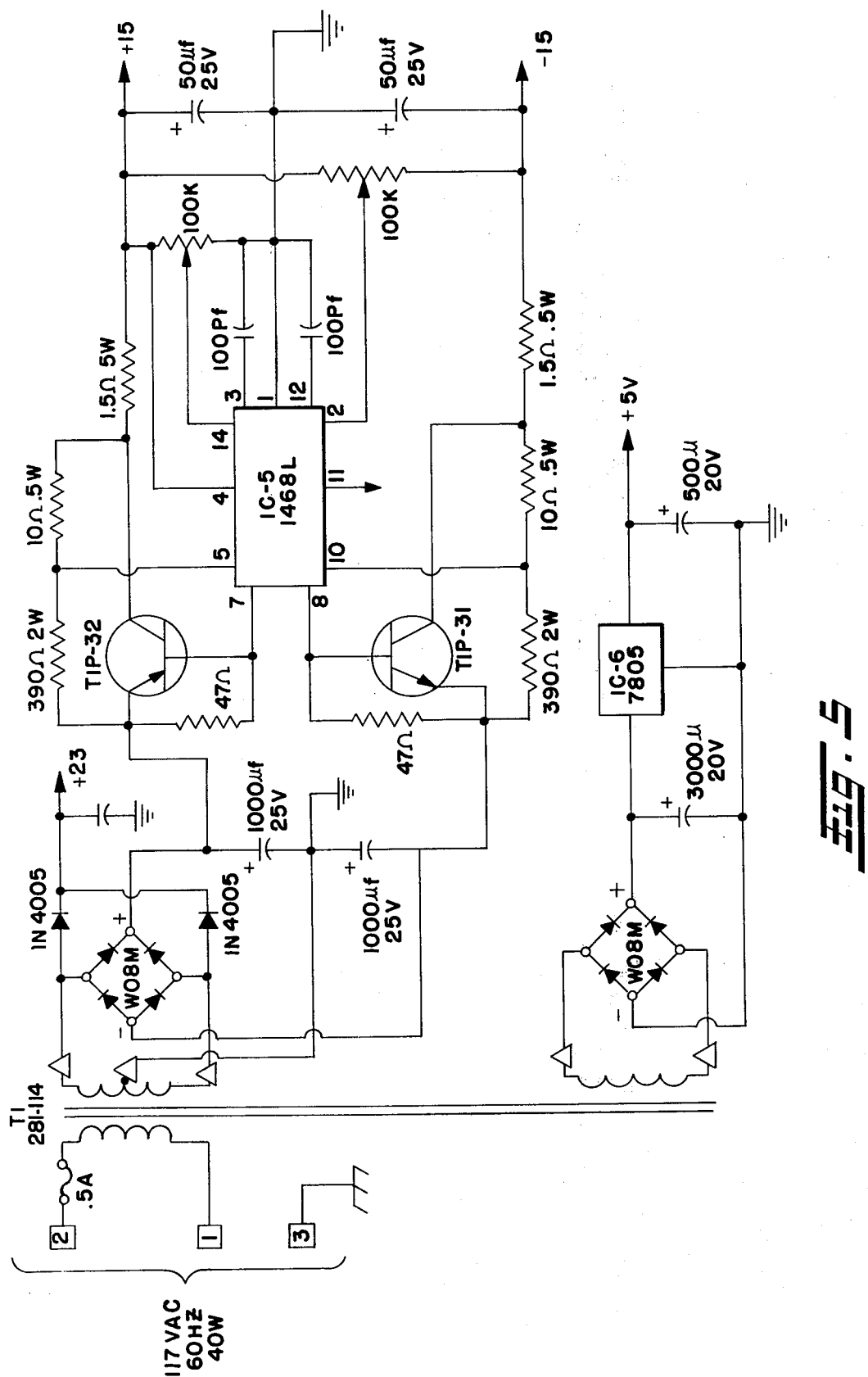
FIG. 5 is a schematic wiring diagram of a preferred form of power supply for the position sensor.

The power supply circuitry is shown in detail in FIG. 5 and provides outputs of +23VDC +15VDC −15VDC and +5VDC from a 117VAC 60 HZ 40 watt input. The pickup circuit portions 30 for pickups A and B may be identical and hence in FIG. 6A only one of the pickup circuit portions 30 has been illustrated in detail and showing the connection of each to IC7 7490 counter B and A. The circuit in FIGS. 6A and B has other features such as "Manual Index" and when +24VDC is supplied, all of the relays K1 to K4 will be deenergized and all of the lamps L1 to L4 will be turned on and stay on until the machine is turned on. Yet another feature is the "Spindle Not Run" circuitry which holds the data and with +24VDC supplied at shutdown of the machine the sensor circuit will hold the last reading so that the machining of the work W may be completed if the shutdown occurs at some stage before completion of the machining operations thereon.

As evident from the foregoing, when the tape for control of the machine tool calls for the work W being in any particular indexed position in accordance with the particular tool which is to perform work on the work W, the machine will not continue any working operations until the jaw assembly 4 (and sensor cap 9) is in the correct position. In such correct position, the impulses picked up by the pickups A and B will be transmitted through appropriate counters and other electronic components (see FIGS. 6A and 6B) and will actuate a particular one of the relays K1, K2, K3, or K4 and until the exact relay is energized, the selected tool will not be advanced to perform its cutting operation on the work W.

The position sensor is of simple, compact construction and is economical to manufacture and maintain and there are no moving parts subjected to wear or breakage except for the movable contacts in the relays K1 to K4.

Insofar as the panel layout of the electronic circuitry is concerned, it is preferred to employ two twelve terminal strips to one of which the relays K1 to K4 are connected, K4 being connected to terminals 1-2-3 with the terminal 1 being normally closed, terminal 2 being normally open, and terminal 3 being the common line, the relays K2, K1 and K3 being respectively connected in the same manner to terminals 4-5-6, 7-8-9, and 10-11-12. The other terminal strip will have the AC power input connected to terminals 1-2-3 with terminal 3 being the ground connection. The "Manual Index" + and − is connected to terminals 4 and 5, the "Spindle Not Run" + and − leads will be connected to terminals 6 and 7, and the pickup leads for pickups A and B are connected respectively to terminals 9-10 and 11-12 with the shield for both pickups A and B is connected to terminal 8.

Preferably, the recess for the head 35 of the clamping cylinder 36 will be covered by a cover plate 37 and as apparent from the several figures of the sensor cap 9 the same has a smooth radially outer surface so as not to cause personal injury, and moreover, if cleaning is necessary, it can be done while the chuck 1 is rotating by either a brush or rag. It is to be noted that the indexing chuck 1 herein may be of any desired size and the sensing circuitry will sense impulses which vary widely in frequency as would be the case in large size chucks which may rotate only at 60 rpm whereas small size chucks may rotate at 900 or more rpm. Furthermore, the circuitry herein is such that once the proper relay has been energized it will remain energized until the desired machining operation or operations on the selected part of the work W is completed whereupon the return of the tool or the indexing of the turret to the next tool will deenergize the previously selected relay and choose the next relay to be energized and also operates the indexing pistons 19' and 20'.

In a four-position indexing chuck 1 as herein shown, the sensor cap 9 and electronic circuitry requires only two pickups A and B to detect either a one pulse difference between pickups A and B (FIGS. 4a or 4c) or a three pulse difference between pickups A and B FIGS. 4b or 4c). In the known construction aforesaid, a four-position indexing chuck requires four radially movable fingers and means for selectively moving each finger radially inward to cooperate with a cam or groove in the sensing disc on the jaw assembly.

The embodiments of the invention in which an exclusive property or privilege is claimed are defined as follows:

1. An indexing chuck comprising a chuck body adapted to be attached to a machine tool spindle; chuck jaws mounted on said body for indexing rotation about a diametric axis and for relative opening and closing motion along said axis; jaw actuating means mounted on said body for opening and closing said jaws; indexing means mounted on said body for indexing of said jaws to a plurality of different positions about said axis; an electronic sensor unit on said machine tool including a pickup head radially outwardly spaced from the periphery of said body in the axial region of said diametric axis; a sensor cap secured to one of said chuck jaws for indexing movement about said diametric axis and having a peripheral surface which passes said pickup head in close proximity thereto during rotation of said chuck; said sensor cap having means on its radially outer surface which produces different electrical impulses in said pickup head and sensor unit according to the indexed position of said sensor cap and chuck jaws; and control means in said sensor unit responsive to such impulses to correlate the operation of the machine tool to engage a selected tool with a selected portion of work clamped between said jaws and indexed to different positions in said chuck.

2. The chuck of claim 1 wherein said sensor cap has distinct areas of magnetic and non-magnetic material to produce different voltage pulses in said pickup head according to the respective positions of said sensor cap and jaw assembly about said diametric axis.

3. The chuck of claim 1 wherein said indexing means indexes said jaws and sensor cap to four different positions 90° apart; wherein said pickup head has two pickup devices to respond to one set of impulses in reversed order in the first and third diametrically opposite positions of said sensor cap and to respond to another set of impulses in reversed order in the second and fourth diametrically opposite positions of said sensor cap; and wherein said sensor unit detects said one set or another set of impulses and the order thereof to determine each indexed position of said sensor cap and jaw assembly.

4. The chuck of claim 3 wherein said sensor cap is of non-magnetic material having a ring of magnetic material to produce two impulses in each pickup device in each indexed position thereof and having different numbers of distinct magnetic areas within said ring to produce in conjunction with the ring impulses said one set and another set of impulses.

5. The chuck of claim 4 wherein said sensor cap has one and two of such areas in the first and third indexed positions and none and three of such areas in the second and fourth indexed positions.

6. The chuck of claim 1 wherein said sensor unit includes relays which are energized according to the respective indexed positions of said sensor cap and jaw assembly.

7. The chuck of claim 6 wherein said relays are selectively energized responsive to distinct areas of magnetic and non-magnetic material on said sensor cap producing different voltage pulses in said sensor unit according to the respective indexed positions of said sensor cap and jaw assembly.

8. The chuck of claim 3 wherein said sensor unit has four relays which are individually energized in the respective first, second, third, and fourth positions of said sensor cap and jaw assembly.

* * * * *